US012246484B2

United States Patent
Lapalme et al.

(10) Patent No.: US 12,246,484 B2
(45) Date of Patent: Mar. 11, 2025

(54) BREAK-WIRE CONDUCTOR MANUFACTURING METHODS

(71) Applicant: Bell Textron Inc., Fort Worth, TX (US)

(72) Inventors: Maxime Lapalme, St-Lin-Laurentides (CA); Nicola Pedneault Plourde, Saint-Jérôme (CA); Jocelyn Lirette, Mirabel (CA)

(73) Assignee: Textron Innovations Inc., Providence, RI (US)

( * ) Notice: Subject to any disclaimer, the term of this patent is extended or adjusted under 35 U.S.C. 154(b) by 412 days.

(21) Appl. No.: 17/680,955

(22) Filed: Feb. 25, 2022

(65) Prior Publication Data

US 2023/0271378 A1     Aug. 31, 2023

(51) Int. Cl.
| | |
|---|---|
| *B29C 64/118* | (2017.01) |
| *B29L 31/34* | (2006.01) |
| *B33Y 10/00* | (2015.01) |
| *B33Y 80/00* | (2015.01) |
| *H01B 13/00* | (2006.01) |

(52) U.S. Cl.
CPC ............ *B29C 64/118* (2017.08); *B33Y 10/00* (2014.12); *B33Y 80/00* (2014.12); *H01B 13/0036* (2013.01); *B29L 2031/34* (2013.01)

(58) Field of Classification Search
CPC ..... B29C 64/106; B29C 64/118; B29C 64/30; B29C 64/40; B29L 2031/34; B33Y 10/00; B33Y 80/00; H01B 13/0036
See application file for complete search history.

(56) References Cited

U.S. PATENT DOCUMENTS

| | | | |
|---|---|---|---|
| 4,955,523 A | * | 9/1990 | Carlommagno ........ H01L 24/11 228/175 |
| 2002/0135727 A1 | | 9/2002 | Nakaminami et al. |
| 2003/0183676 A1 | | 10/2003 | Greenwell |
| 2004/0189289 A1 | | 9/2004 | Atherton |
| 2005/0212103 A1 | | 9/2005 | Takata |
| 2009/0015249 A1 | | 1/2009 | Buttle et al. |
| 2009/0174426 A1 | | 7/2009 | Matoba et al. |
| 2009/0321774 A1 | | 12/2009 | Ishi et al. |
| 2011/0086224 A1 | | 4/2011 | Volpi |
| 2011/0187380 A1 | | 8/2011 | Gerig |
| 2014/0110872 A1 | * | 4/2014 | Levy ..................... B33Y 10/00 425/143 |

(Continued)

FOREIGN PATENT DOCUMENTS

WO    WO-2019243217 A1 *  12/2019   ........... B29C 64/118

OTHER PUBLICATIONS

Ultimaker, "Ultimaker PVA Explained—Water-soluble support material," YouTube Video, Oct. 18, 2016, https://www.youtube.com/watch?v=0ENgGkPP94w&t=49s&ab_channel=UltiMaker, 2 pages.

*Primary Examiner* — Minh N Trinh
(74) *Attorney, Agent, or Firm* — Bradley Arant Boult Cummings LLP

(57) ABSTRACT

A method of producing an article of manufacture includes printing a break-wire conductive-material pattern via an additive-manufacturing process and applying the break-wire conductive-material pattern to a surface of a component. A shape of the break-wire conductive-material pattern fits the surface of the component.

11 Claims, 4 Drawing Sheets

(56) References Cited

U.S. PATENT DOCUMENTS

| | | |
|---|---|---|
| 2019/0322047 A1* | 10/2019 | Riha ................. B33Y 30/00 |
| 2020/0391616 A1 | 12/2020 | Wilson |
| 2021/0190542 A1 | 6/2021 | Wilson et al. |
| 2021/0261019 A1 | 8/2021 | Wilson |
| 2021/0272438 A1 | 9/2021 | Askenmalm |
| 2023/0262886 A1* | 8/2023 | Greenspan ............ H05K 1/144 |
| | | 361/720 |
| 2023/0271378 A1* | 8/2023 | Lapalme ........... H01B 13/0036 |
| | | 29/825 |
| 2024/0080991 A1* | 3/2024 | Cheng ................. H05K 1/032 |

* cited by examiner

BREAK-WIRE CONDUCTOR MANUFACTURING METHODS

TECHNICAL FIELD

The present disclosure relates generally to break-wire conductors used to detect cracks in parts and more particularly, but not by way of limitation, to break-wire conductors that are additively manufactured.

BACKGROUND

This section provides background information to facilitate a better understanding of the various aspects of the disclosure. It should be understood that the statements in this section of this document are to be read in this light and not as admissions of prior art.

Detection of cracks in parts or an assembly thereof during, for example, fatigue testing presents challenges, in part due to the difficulty of predicting a crack initiation site. A typical method involves installation of a break-wire conductor (e.g., a weak copper wire), a failure of which opens a circuit such that the presence of a crack is indicated. The typical method often relies on manual labor for the break-wire conductor installation and can therefore be particularly difficult and unreliable when the installation is on complex geometries or small areas of a component or assembly.

FIG. 1 illustrates an assembly 100 with manually-applied break-wire conductors 104 and 106 applied thereto. The break-wire conductor 104 and the break-wire conductor 106 are each applied to particular portions of a surface of the assembly 100 and serve to indicate when a crack or other failure of the assembly 100 has occurred during, for example, failure testing. However, as noted above, manual installation of break-wire conductors such as the break-wire conductor 104 and the break-wire conductor 106 as illustrated in FIG. 1 can be particularly difficult and unreliable when they are installed on complex geometries or small areas of a component or assembly.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A method of producing an article of manufacture includes printing a break-wire conductive-material pattern via an additive-manufacturing process and applying the break-wire conductive-material pattern to a surface of a component. A shape of the break-wire conductive-material pattern fits the surface of the component.

An article of manufacture includes a base material and a break-wire conductive-material pattern integrated with the base material. The base material and the break-wire conductive-material pattern are additively manufactured via a 3D printer.

An article of manufacture includes a component and a break-wire conductive-material pattern printed via an additive-manufacturing process and applied to a surface of the component. A shape of the break-wire conductive-material pattern fits the surface of the component.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein. Various embodiments discussed herein can be employed in a test environment or in parts and assemblies in use in the field and provide a less labor-intensive and more repeatable break-wire solution than prior approaches.

Figure 2:
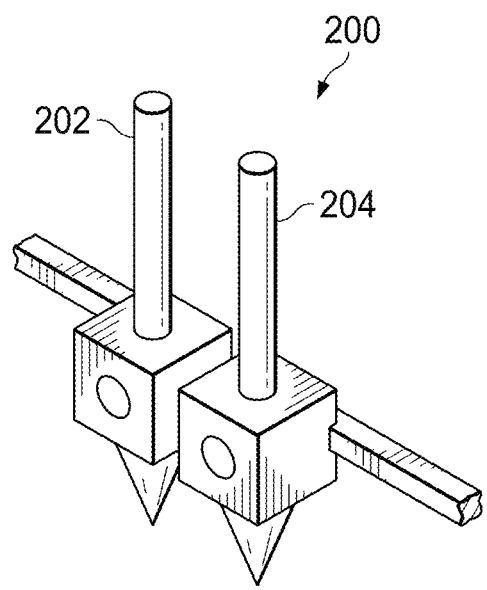
FIG. 2 illustrates a print head that can print a conductive-material pattern and a base material.

FIG. 2 illustrates a print head 200 that can print a break-wire conductive-material pattern and a support material. In a typical embodiment, the print head 200 is part of a three-dimensional ("3D") printer that can be used to print objects comprised of multiple different materials. 3D printing, also referred to as additive manufacturing, is a process used to create a physical object by layering materials one by one based on a digital model. Unlike subtractive manufacturing, which creates a final product by cutting away from a block of material, additive manufacture adds material to form a final product.

The print head 200 is fed with a conductive-material feed 202 that can be used to print break-wire conductive material and a support-material feed 204 that can be used to print a support material, the support material often being a substrate dissolvable, for example, in water. The break-wire conductive material can be used to print a break-wire conductive-material pattern that can be applied to an existing component or assembly.

Figure 3:
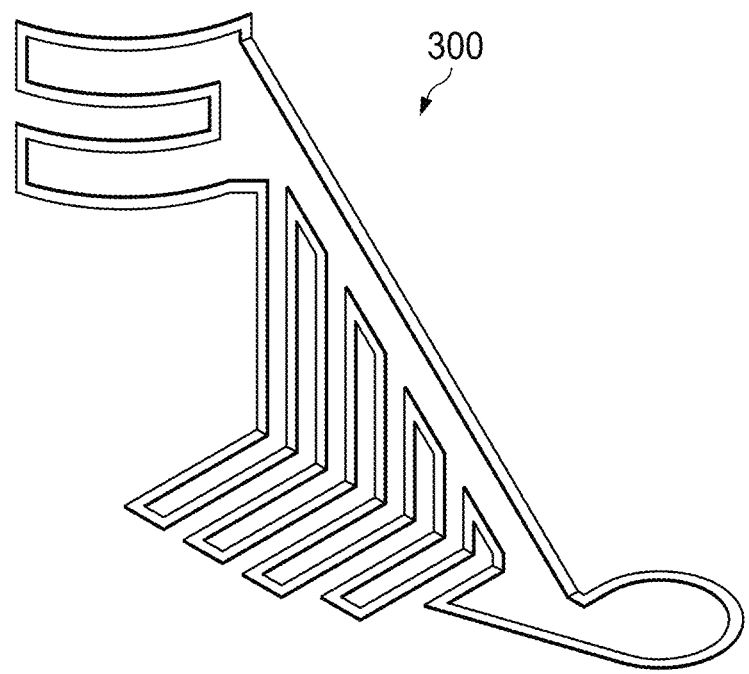
FIG. 3 illustrates a conductive-material pattern printed via, for example, the print head of FIG. 2.

FIG. 3 illustrates a break-wire conductive-material pattern 300 printed via, for example, the print head of FIG. 2. As is apparent from FIG. 3, the break-wire conductive-material pattern 300 is printed in a complex three-dimensional pattern via, for example, the conductive-material 202 and the print head 200, support material (not shown) having been dissolved.

Figure 1:
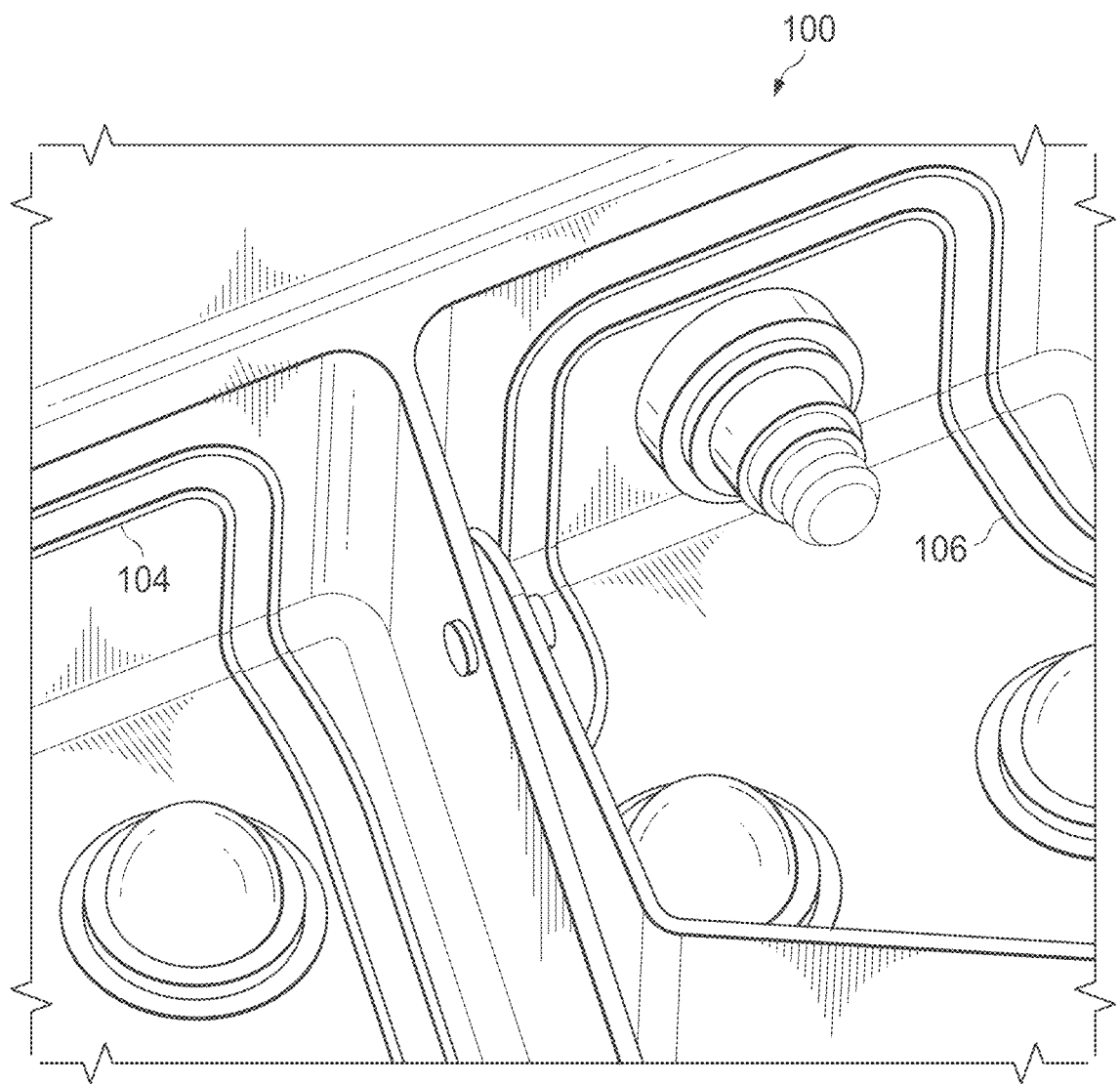
FIG. 1, discussed above, illustrates an assembly with manually-applied break-wire conductors applied thereto.
Figure 4:
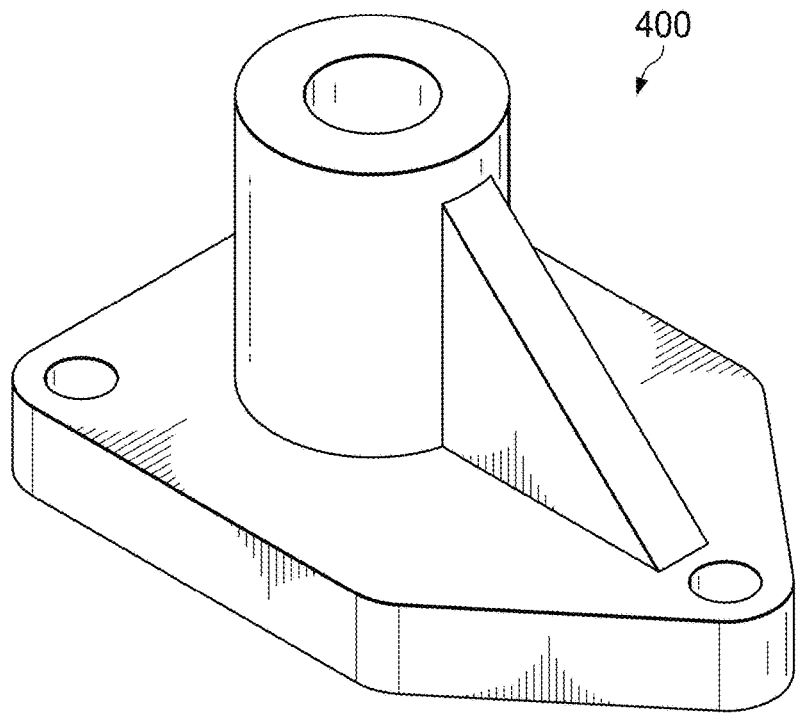
FIG. 4 illustrates a component on which the printed conductive-material pattern of FIG. 3 can be applied.

FIG. 4 illustrates a component 400 on which the printed break-wire conductive-material pattern 300 of FIG. 3 can be applied. A three-dimensional shape of the component 400 is such that the break-wire conductive-material pattern 300 may be mated therewith in order that the component 400 and the break-wire conductive-material pattern 300 fit to one another without the need for manual installation as discussed above relative to FIG. 1. The component 400 can be additively manufactured, although this is not necessarily the case.

Figure 5:
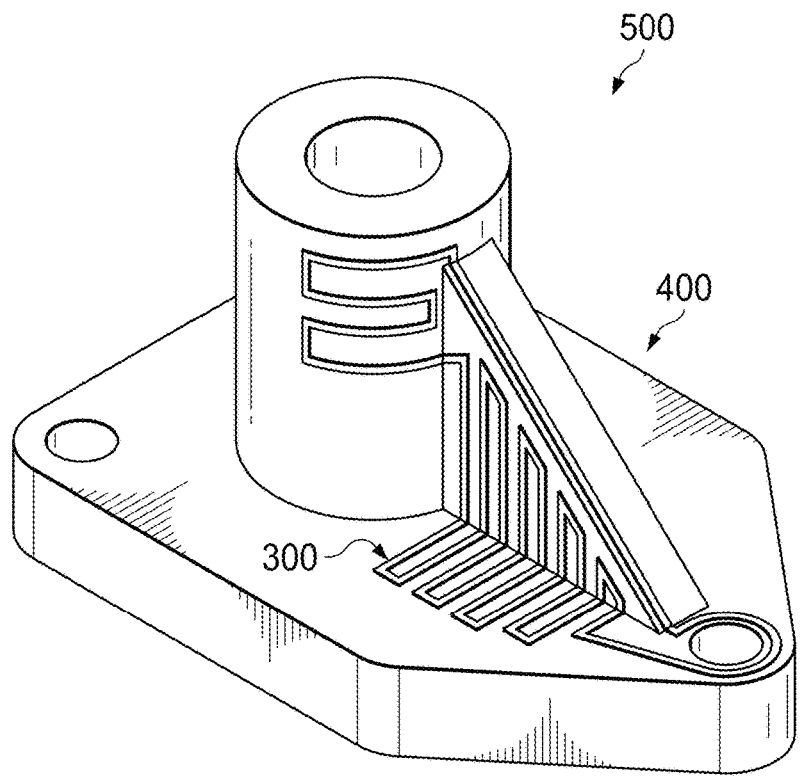
FIG. 5 illustrates the component of FIG. 4 with the printed conductive-material pattern of FIG. 3 applied thereto.

FIG. 5 illustrates the component 400 of FIG. 4 with the printed break-wire conductive-material pattern 300 of FIG. 3 applied thereto to form an assembly 500. As indicated above, the break-wire conductive-material pattern 300, which has been printed to have a three-dimensional geometry to mate with a surface of the component 400, may be more easily applied to the component 400 than in prior approaches that involved manual installation of a break-wire conductor. In a typical embodiment, after the break-wire conductive-material pattern 300 has been printed, a support material (not shown) on which the break-wire conductive-material pattern 300 has been printed is dissolved and the break-wire conductive-material pattern 300 is applied to the component 400. In a typical embodiment, the component 400 is composed of a non-conductive material such as, for example, a non-conductive plastic. In other embodiments, paint or varnish can be applied to the component 400 in the event the component 400 is made of a conductive material so as to provide a barrier between the conductive component 400 and the break-wire conductive-material pattern 300.

Figure 6:
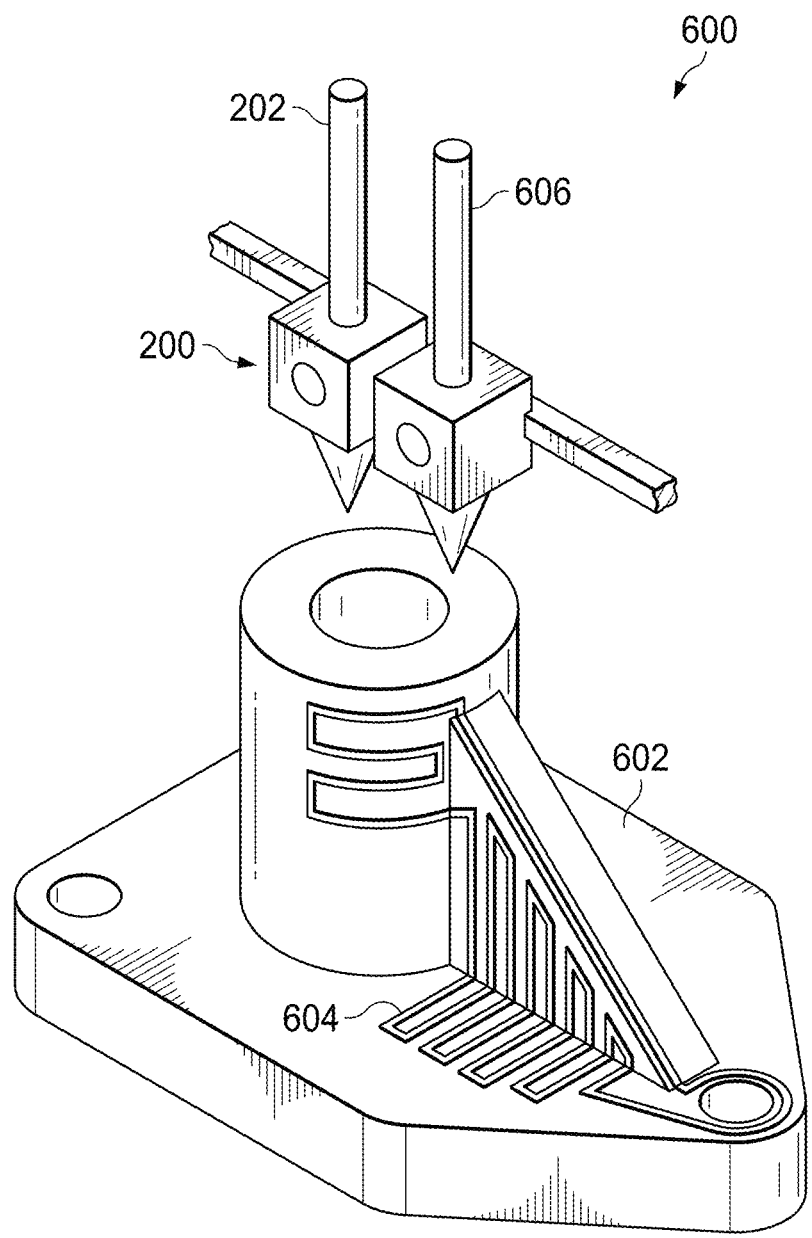
FIG. 6 illustrates a print head and a part, printed via the print head, that includes a printed integrated conductive-material pattern.

FIG. 6 illustrates an assembly 600. The assembly 600 includes a component 602 and a break-wire conductive-material pattern 604. The break-wire conductive-material pattern 604 and the component 602 are printable via, for example, the print head 200 as an integrated object, in contrast to the discussion above relative to FIGS. 2-5 in which the break-wire conductive-material pattern 300 is applied to the component 400 to form the assembly 500. The component 602 is made of a base material.

The conductive-material feed 202 is used to print the break-wire conductive-material pattern 604 and a base-material feed 606 used to print the component 602, which components together form the assembly 600. As discussed above and although not illustrated in FIG. 6, a dissolvable support-material feed may also be additively manufactured to support the assembly 600.

In a typical embodiment, the component 602 is composed of a non-conductive material such as, for example, a non-conductive plastic. In other embodiments, in the event the component 602 is made of a conductive base material, a third, non-conductive, material can be printed in a fashion to provide a barrier between the component 602 and the break-wire conductive-material pattern 604. It will be apparent that the approach illustrated in FIG. 6 does not require an installation step and can result in improved robustness relative to prior solutions. In some embodiments, multiple break-wire conductive-material patterns could be utilized in order to provide more information in the event of a failure, such as, for example, where a crack began or a direction in which a crack progressed.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of producing an article of manufacture, the method comprising in a sequential order of steps:
   three dimensional (3D) printing a break-wire conductive-material pattern on a dissolvable support material;
   dissolving the dissolvable support material on which the break-wire conductive-material pattern has been 3D printed to form the break-wire conductive-material pattern;
   applying a non-conductive barrier layer to a component; and
   applying the break-wire conductive-material pattern directly onto the non-conductive barrier layer on a surface of the component, thereby forming the article of manufacture;
   wherein a shape of the break-wire conductive-material pattern fits the surface of the component.

2. The method of claim 1, wherein the component is composed of a non-conductive material.

3. The method of claim 2, wherein the component comprises non-conductive plastic.

4. The method of claim 1, wherein the component is composed of a conductive material and the surface comprises the non-conductive barrier layer.

5. The method of claim 1, further comprising:
   3D printing a second break-wire conductive-material pattern and dissolving a support material on which the second break-wire conductive-material pattern has been printed;
   applying the second break-wire conductive-material pattern to other surface portions of the component; and
   wherein the break-wire conductive-material pattern and the second break-wire conductive-material pattern do not overlap one another.

6. The method of claim 1, further comprising, before the applying the break-wire conductive-material pattern to the surface of the component, printing the component via an additive-manufacturing process.

7. A method of producing an article of manufacture, the method comprising in a sequential order of steps:
- three dimensional (3D) printing a break-wire conductive-material pattern on a dissolvable support material;
- dissolving the dissolvable support material on which the break-wire conductive-material pattern has been 3D printed to form the break-wire conductive-material pattern;
- applying the break-wire conductive-material pattern to a surface of a component, thereby forming the article of manufacture;
- 3D printing a second break-wire conductive-material pattern on a dissolvable support material;
- dissolving the dissolvable support material on which the second break-wire conductive-material pattern has been printed; and
- applying the second break-wire conductive-material pattern to other surface portions of the component;
- wherein the break-wire conductive-material pattern and the second break-wire conductive-material pattern do not overlap one another.

8. The method of claim 7, wherein a shape of the break-wire conductive-material pattern fits the surface of the component.

9. The method of claim 7, wherein a shape of the second break-wire conductive-material pattern fits the other surface portions of the component.

10. The method of claim 7, wherein the component is composed of a non-conductive material.

11. The method of claim 10, wherein the component comprises non-conductive plastic.

* * * * *